United States Patent
Kellogg

(10) Patent No.: US 9,485,957 B2
(45) Date of Patent: Nov. 8, 2016

(54) PET KENNEL

(71) Applicant: SportPet Designs, Inc., Waukesha, WI (US)

(72) Inventor: Adam M. Kellogg, Oconomowoc, WI (US)

(73) Assignee: SportPet Designs, Inc., Waukesha, WI (US)

( * ) Notice: Subject to any disclaimer, the term of this patent is extended or adjusted under 35 U.S.C. 154(b) by 117 days.

(21) Appl. No.: 14/471,207

(22) Filed: Aug. 28, 2014

(65) Prior Publication Data

US 2016/0057969 A1   Mar. 3, 2016

(51) Int. Cl.
*A01K 1/02*    (2006.01)
*A01K 1/03*    (2006.01)

(52) U.S. Cl.
CPC ..................... *A01K 1/034* (2013.01)

(58) Field of Classification Search
CPC .. A01K 1/034; A01K 1/0245; A01K 1/0035; A01K 1/035
USPC ................................. 119/452–501
See application file for complete search history.

(56) References Cited

U.S. PATENT DOCUMENTS

| | | |
|---|---|---|
| 177,749 A | 3/1876 | Redden |
| 216,227 A | 6/1879 | Sedgwick |
| 217,362 A | 7/1879 | Gardner |
| 218,277 A | 8/1879 | Kilham |
| 251,325 A | 12/1881 | Walters |
| 288,654 A | 11/1883 | Morse |
| 338,892 A | 3/1886 | Walker |
| 344,340 A | 6/1886 | Barrow |
| 356,301 A | 1/1887 | Belknap |
| 414,622 A | 11/1889 | Willits |
| 481,957 A | 9/1892 | Klank |
| 665,942 A | 1/1901 | Tabler |
| 679,612 A | 7/1901 | Evans |
| 929,430 A | 7/1909 | Hill |
| 945,918 A | 1/1910 | Crawford |
| 975,745 A | 11/1910 | Bower |
| 1,087,702 A | 2/1914 | Van Patten |

(Continued)

FOREIGN PATENT DOCUMENTS

| | | |
|---|---|---|
| DE | 281680 | 8/1913 |
| DE | 2015649 | 2/1971 |

(Continued)

OTHER PUBLICATIONS

"Magic Maaze" Frongate Mail-Order Catalog, Summer 1995, p. 32.

(Continued)

*Primary Examiner* — Kristen C Hayes
*Assistant Examiner* — Ebony Evans
(74) *Attorney, Agent, or Firm* — Ryan Kromholz & Manion, S.C.

(57) ABSTRACT

System and method directed to the art of pet kennels, more particularly collapsible pet kennels, are provided. A collapsible pet kennel having a first framework and a second framework both rotatably attached to a base framework, a first swing arm pivotably attached to the first framework and removably engageable with the second framework, a second swing arm pivotably attached to the second framework and removably engageable with the first framework, and a covering which encloses the pet kennel. The pet kennel is capable of being collapsed without removing the covering.

12 Claims, 6 Drawing Sheets

(56) References Cited

U.S. PATENT DOCUMENTS

| | | |
|---|---|---|
| 1,135,892 A | 4/1915 | Grosenbeck |
| 1,144,643 A | 6/1915 | Elkins |
| 1,155,475 A | 10/1915 | Fay |
| 1,159,323 A | 11/1915 | Maltby |
| 1,167,497 A | 1/1916 | Hayes |
| 1,180,574 A | 4/1916 | Despot |
| 1,181,829 A | 5/1916 | Bower |
| 1,206,618 A | 11/1916 | Thrasher |
| 1,251,560 A | 1/1918 | Myskow |
| 1,263,294 A | 4/1918 | Taylor |
| 1,303,736 A | 5/1919 | Speicher |
| 1,308,268 A | 7/1919 | Wagner et al. |
| 1,360,844 A | 11/1920 | Williams |
| 1,394,007 A | 10/1921 | Hall |
| 1,451,468 A | 4/1923 | Olshan |
| 1,520,532 A | 12/1924 | Clark |
| 1,538,260 A | 5/1925 | Street et al. |
| 1,581,888 A | 4/1926 | Thomas |
| 1,583,083 A | 5/1926 | Macaraig |
| 1,640,083 A | 8/1927 | Ladd |
| 1,647,679 A | 11/1927 | Williams |
| 1,691,904 A | 11/1928 | Gamble |
| 1,703,066 A | 2/1929 | Horn |
| 1,832,715 A | 11/1931 | London |
| 1,836,297 A | 12/1931 | Vienna |
| 1,979,978 A | 11/1934 | Martin |
| 1,994,235 A | 3/1935 | Solomon |
| 1,999,424 A | 4/1935 | Seitz |
| 2,009,035 A | 7/1935 | Towers |
| 2,016,520 A | 10/1935 | Short |
| 2,042,888 A | 6/1936 | Flood |
| 2,057,942 A | 10/1936 | Fay |
| 2,071,850 A | 2/1937 | Miller |
| 2,115,308 A | 4/1938 | Koch |
| 2,136,761 A | 11/1938 | Simmons |
| 2,182,932 A | 12/1939 | Sanford |
| 2,269,574 A | 1/1942 | Benenfeld |
| 2,280,601 A | 4/1942 | Otter |
| 2,295,584 A | 9/1942 | Larson |
| 2,298,786 A | 10/1942 | Dubofsky et al. |
| 2,361,743 A | 10/1944 | Butler |
| 2,470,223 A | 5/1949 | Powels |
| 2,517,757 A | 8/1950 | Alderstein |
| 2,544,074 A | 3/1951 | Ernst et al. |
| 2,575,893 A | 11/1951 | Seaman |
| 2,600,501 A | 6/1952 | Higgs |
| 2,625,973 A | 1/1953 | Weldon et al. |
| 2,639,819 A | 5/1953 | Marks |
| 2,664,131 A | 12/1953 | Miller |
| 2,710,084 A | 6/1955 | Braverman |
| 2,721,099 A | 10/1955 | Rupp |
| 2,724,537 A | 11/1955 | Fehr |
| 2,746,582 A | 5/1956 | Cart |
| 2,761,480 A | 9/1956 | Tames |
| 2,767,757 A | 10/1956 | Marder |
| 2,778,560 A | 1/1957 | Pfeiffer |
| 2,780,402 A | 2/1957 | Zucker et al. |
| 2,833,460 A | 5/1958 | Votolato |
| 2,879,553 A | 3/1959 | Keating |
| 2,958,357 A | 11/1960 | Vorgan |
| 3,014,516 A | 12/1961 | Mueller |
| 3,017,117 A | 1/1962 | Klingler |
| 3,061,396 A | 10/1962 | Hock |
| 3,105,505 A | 10/1963 | Maybee |
| 3,126,933 A | 3/1964 | Mason et al. |
| 3,160,307 A | 12/1964 | Morrison |
| 3,233,644 A | 2/1966 | Bono |
| 3,257,077 A | 6/1966 | Corning |
| 3,260,396 A | 7/1966 | Buch |
| 3,265,284 A | 8/1966 | Tompkins |
| 3,310,089 A | 3/1967 | Silverman |
| 3,354,924 A | 11/1967 | Birrell et al. |
| 3,373,925 A | 3/1968 | Gatward |
| 3,410,328 A | 11/1968 | Sasai |
| D213,131 S | 1/1969 | Hamilton |
| 3,434,589 A | 3/1969 | Valtri et al. |
| 3,439,865 A | 4/1969 | Port et al. |
| D215,846 S | 11/1969 | Curtin et al. |
| 3,480,059 A | 11/1969 | Schoening |
| 3,481,311 A | 12/1969 | Schluttig |
| 3,502,091 A | 3/1970 | Corbin |
| 3,583,748 A | 6/1971 | Arndt |
| 3,603,367 A | 9/1971 | Lehrman |
| 3,661,326 A | 5/1972 | Wilson |
| 3,675,667 A | 7/1972 | Miller |
| 3,675,981 A | 7/1972 | Mallander |
| 3,696,850 A | 10/1972 | Rosenblum |
| 3,709,237 A | 1/1973 | Smith |
| 3,727,786 A | 4/1973 | Fausel |
| 3,732,978 A | 5/1973 | Reader |
| 3,733,758 A | 5/1973 | Maier et al. |
| 3,796,342 A | 3/1974 | Sanders et al. |
| 3,799,384 A | 3/1974 | Hurkamp |
| 3,807,421 A | 4/1974 | Geiger et al. |
| 3,834,528 A | 9/1974 | Pickford et al. |
| 3,843,222 A | 10/1974 | Berkun |
| 3,868,155 A | 2/1975 | Cherubini |
| 3,880,459 A | 4/1975 | Kelley |
| 3,883,026 A | 5/1975 | Selz |
| 3,893,649 A | 7/1975 | Cornell et al. |
| 3,935,958 A | 2/1976 | Frangos |
| 3,946,903 A | 3/1976 | Parker |
| 3,955,706 A | 5/1976 | Whitaker |
| 3,960,161 A | 6/1976 | Norman |
| 3,987,580 A | 10/1976 | Ausnit |
| 3,990,463 A | 11/1976 | Norman |
| 4,010,784 A | 3/1977 | Nattrass et al. |
| 4,011,611 A | 3/1977 | Lederman |
| 4,055,239 A | 10/1977 | Weiner |
| 4,073,105 A | 2/1978 | Daugherty |
| 4,094,639 A | 6/1978 | McMillan |
| 4,118,089 A | 10/1978 | Johnson et al. |
| 4,133,149 A | 1/1979 | Angress |
| 4,134,225 A | 1/1979 | Welch |
| 4,165,757 A | 8/1979 | Marks |
| 4,170,082 A | 10/1979 | Freedman |
| 4,180,113 A | 12/1979 | Liebling |
| 4,195,804 A | 4/1980 | Hujsak et al. |
| 4,212,130 A | 7/1980 | Walker |
| 4,212,377 A | 7/1980 | Weinreb |
| 4,246,945 A | 1/1981 | Sterling |
| 4,248,278 A | 2/1981 | Blodgett |
| 4,248,442 A | 2/1981 | Barrett |
| 4,265,261 A | 5/1981 | Barker |
| 4,287,701 A | 9/1981 | Washington |
| 4,299,365 A | 11/1981 | Battle |
| 4,304,068 A | 12/1981 | Beder |
| 4,313,634 A | 2/1982 | Williams |
| 4,352,457 A | 10/1982 | Weick |
| 4,388,739 A | 6/1983 | Martinon et al. |
| 4,401,213 A | 8/1983 | Lerner |
| D270,939 S | 10/1983 | Stehlik |
| 4,411,300 A | 10/1983 | Rico |
| 4,427,110 A | 1/1984 | Shaw, Jr. |
| 4,428,484 A | 1/1984 | Rattay et al. |
| D274,662 S | 7/1984 | Fausel |
| 4,485,855 A | 12/1984 | Dillingham |
| D279,038 S | 5/1985 | Thompson, Jr. |
| D279,249 S | 6/1985 | Fausel |
| 4,550,440 A | 10/1985 | Rico |
| 4,580,776 A | 4/1986 | Burkinshaw |
| 4,585,283 A | 4/1986 | Redmon et al. |
| 4,588,154 A | 5/1986 | Basore |
| 4,590,885 A | 5/1986 | Sugiura |
| 4,603,432 A | 7/1986 | Marino |
| 4,610,394 A | 9/1986 | Bryson |
| 4,630,312 A | 12/1986 | Milstein |
| 4,630,747 A | 12/1986 | Chiang et al. |
| 4,632,138 A | 12/1986 | Irwin |
| D288,019 S | 1/1987 | Gebhard et al. |
| 4,635,411 A | 1/1987 | Kurzen |
| 4,642,934 A | 2/1987 | Carlson et al. |
| 4,646,802 A | 3/1987 | Basore et al. |
| D290,538 S | 6/1987 | Basore |

(56) References Cited

U.S. PATENT DOCUMENTS

| | | |
|---|---|---|
| 4,683,927 A | 8/1987 | Pyzer |
| 4,697,357 A | 10/1987 | Van Vliet |
| 4,706,845 A | 11/1987 | Schnurer et al. |
| 4,715,572 A | 12/1987 | Robbins, III et al. |
| 4,716,918 A | 1/1988 | Hayashida et al. |
| 4,728,066 A | 3/1988 | Lang et al. |
| 4,730,748 A | 3/1988 | Bane |
| 4,738,478 A | 4/1988 | Bean, Jr. |
| 4,747,701 A | 5/1988 | Perkins |
| 4,752,008 A | 6/1988 | Pratt |
| 4,759,518 A | 7/1988 | Yardas |
| 4,779,794 A | 10/1988 | Moore |
| 4,781,300 A | 11/1988 | Long |
| 4,783,031 A | 11/1988 | Ebentheuer |
| 4,784,248 A | 11/1988 | Workman |
| 4,790,029 A | 12/1988 | LaFleur et al. |
| 4,803,951 A | 2/1989 | Davis |
| 4,812,054 A | 3/1989 | Kirkendall |
| 4,813,520 A | 3/1989 | Lin |
| 4,815,784 A | 3/1989 | Zheng |
| 4,825,892 A | 5/1989 | Norman |
| 4,842,032 A | 6/1989 | Mastronardo |
| 4,854,501 A | 8/1989 | Ricci |
| 4,858,561 A | 8/1989 | Springer |
| 4,858,634 A | 8/1989 | McLese |
| 4,862,602 A | 9/1989 | Krill |
| 4,876,829 A | 10/1989 | Mattick |
| 4,895,230 A | 1/1990 | King |
| 4,899,967 A | 2/1990 | Johnson |
| 4,903,584 A | 2/1990 | Styles |
| 4,925,102 A | 5/1990 | Jones et al. |
| 4,940,200 A | 7/1990 | Sawyer et al. |
| 4,946,118 A | 8/1990 | Hastings |
| 4,948,077 A | 8/1990 | Gonzalez |
| 4,951,333 A | 8/1990 | Kaiser et al. |
| 4,953,815 A | 9/1990 | Beymer et al. |
| 4,964,859 A | 10/1990 | Feldman |
| 4,989,749 A | 2/1991 | Choi |
| 4,995,487 A | 2/1991 | Plath |
| D315,432 S | 3/1991 | Smith |
| 5,007,250 A | 4/1991 | Musielak |
| 5,009,189 A | 4/1991 | Neff |
| 5,011,008 A | 4/1991 | Baker |
| 5,022,767 A | 6/1991 | Cardulla |
| 5,024,262 A | 6/1991 | Huang |
| 5,027,748 A | 7/1991 | Wolak |
| 5,031,277 A | 7/1991 | Coker |
| 5,031,793 A | 7/1991 | Chen et al. |
| 5,035,460 A | 7/1991 | Huang |
| 5,036,999 A | 8/1991 | Bitsch |
| 5,038,812 A | 8/1991 | Norman |
| 5,054,507 A | 10/1991 | Sparks |
| 5,072,828 A | 12/1991 | Irvine |
| 5,082,219 A | 1/1992 | Blair |
| 5,090,588 A | 2/1992 | Van Romer et al. |
| RE33,842 E | 3/1992 | Ebentheuer |
| 5,116,138 A | 5/1992 | Macsenti et al. |
| 5,118,201 A | 6/1992 | Cook |
| 5,134,815 A | 8/1992 | Pickett |
| 5,137,044 A | 8/1992 | Brady |
| 5,143,283 A | 9/1992 | Lancaster |
| 5,174,462 A | 12/1992 | Hames |
| 5,195,649 A | 3/1993 | Wolters |
| 5,197,154 A * | 3/1993 | Shamie ............... A47D 13/063 5/98.1 |
| 5,213,147 A | 5/1993 | Zheng |
| 5,222,513 A | 6/1993 | Hilliard |
| 5,230,304 A | 7/1993 | Santoro |
| 5,253,775 A | 10/1993 | Gould |
| 5,263,672 A | 11/1993 | He |
| 5,273,142 A | 12/1993 | Weber |
| 5,301,705 A | 4/1994 | Zheng |
| 5,316,060 A | 5/1994 | Hodgdon et al. |
| 5,320,065 A | 6/1994 | Leopold |
| 5,324,490 A | 6/1994 | Van Vlahakis et al. |
| 5,335,805 A | 8/1994 | Chen |
| 5,343,887 A | 9/1994 | Danaher |
| 5,356,024 A | 10/1994 | Ho et al. |
| 5,358,440 A | 10/1994 | Zheng |
| 5,375,267 A | 12/1994 | Davis |
| 5,382,087 A | 1/1995 | Pouch |
| 5,393,023 A | 2/1995 | Callan |
| 5,394,897 A | 3/1995 | Ritchey et al. |
| 5,411,046 A | 5/1995 | Wan |
| 5,429,437 A | 7/1995 | Shaw et al. |
| 5,437,384 A | 8/1995 | Farrell |
| 5,437,410 A | 8/1995 | Babasade |
| 5,449,083 A | 9/1995 | Dougherty et al. |
| 5,452,681 A | 9/1995 | Ho |
| 5,464,113 A | 11/1995 | Ho et al. |
| 5,467,794 A | 11/1995 | Zheng |
| 5,468,061 A | 11/1995 | Friess et al. |
| 5,472,280 A | 12/1995 | Rittmaster |
| 5,474,196 A | 12/1995 | Fausel et al. |
| 5,484,078 A | 1/1996 | Bronovicki |
| 5,492,675 A | 2/1996 | Brizard |
| 5,560,385 A | 10/1996 | Zheng |
| 5,576,621 A | 11/1996 | Clements |
| 5,593,046 A | 1/1997 | Katsuura et al. |
| 5,620,069 A | 4/1997 | Hurwitz |
| 5,653,194 A | 8/1997 | Guy |
| 5,664,596 A | 9/1997 | Zheng |
| 5,664,886 A | 9/1997 | Hutchinson |
| 5,667,066 A | 9/1997 | Simpson |
| 5,669,331 A | 9/1997 | Richmond |
| 5,671,479 A | 9/1997 | Dedrick |
| 5,722,446 A | 3/1998 | Zheng |
| 5,746,514 A | 5/1998 | Orensten |
| 5,762,530 A | 6/1998 | Zheng |
| 5,778,915 A | 7/1998 | Zheng |
| D397,756 S | 9/1998 | Hagerty |
| 5,800,067 A | 9/1998 | Easter |
| 5,816,279 A | 10/1998 | Zheng |
| 5,816,954 A | 10/1998 | Zheng |
| 5,827,104 A | 10/1998 | Zheng |
| 5,845,697 A | 12/1998 | Zheng |
| 5,853,313 A | 12/1998 | Zheng |
| 5,862,624 A | 1/1999 | Askins |
| D406,423 S | 3/1999 | Kellogg et al. |
| D407,765 S | 4/1999 | Zheng |
| 5,901,926 A | 5/1999 | Zheng |
| 5,906,290 A | 5/1999 | Haberkorn |
| 5,910,038 A | 6/1999 | Zheng |
| 5,910,058 A | 6/1999 | Zheng |
| 5,927,793 A | 7/1999 | McGrath, Jr. |
| 5,938,496 A | 8/1999 | Zheng |
| 5,941,265 A | 8/1999 | Zheng |
| 5,960,744 A | 10/1999 | Rutman |
| 5,964,533 A | 10/1999 | Ziglar |
| 5,967,090 A | 10/1999 | Hui |
| 5,967,357 A | 10/1999 | Kellogg et al. |
| 5,971,188 A | 10/1999 | Kellogg et al. |
| 5,971,410 A | 10/1999 | Nichols |
| 5,975,101 A | 11/1999 | Zheng |
| 5,992,045 A | 11/1999 | Kellogg et al. |
| 5,992,676 A | 11/1999 | Tsai |
| D417,977 S | 12/1999 | Veto |
| 6,006,772 A | 12/1999 | Zheng |
| 6,021,740 A | 2/2000 | Martz |
| 6,059,912 A | 5/2000 | Kellogg et al. |
| 6,076,485 A | 6/2000 | Peeples et al. |
| 6,082,574 A | 7/2000 | Johnson |
| 6,088,953 A | 7/2000 | Morgan |
| 6,089,394 A | 7/2000 | Ziglar |
| 6,092,488 A | 7/2000 | Allawas |
| 6,102,569 A | 8/2000 | Wang |
| 6,109,281 A | 8/2000 | Lowenthal |
| D431,361 S | 10/2000 | Kellogg et al. |
| D433,810 S | 11/2000 | Kellogg et al. |
| D438,009 S | 2/2001 | Kellogg et al. |
| 6,209,557 B1 | 4/2001 | Zheng |
| 6,220,998 B1 | 4/2001 | Kellogg et al. |
| 6,269,826 B1 | 8/2001 | Zheng |
| D449,447 S | 10/2001 | Kellogg et al. |

(56) References Cited

U.S. PATENT DOCUMENTS

| | | | |
|---|---|---|---|
| 6,305,396 B1 | 10/2001 | Zheng | |
| 6,311,709 B1 | 11/2001 | Louie et al. | |
| 6,345,591 B1 | 2/2002 | Richmond | |
| 6,360,760 B1 | 3/2002 | Louie et al. | |
| 6,360,761 B1 | 3/2002 | Zheng | |
| 6,363,955 B1 | 4/2002 | Louie | |
| 6,390,111 B2 | 5/2002 | Zheng | |
| D461,638 S | 8/2002 | Kellogg et al. | |
| 6,439,165 B1 | 8/2002 | Guard | |
| 6,446,577 B1 | 9/2002 | Salahor | |
| RE37,924 E | 12/2002 | Kellogg et al. | |
| 6,494,335 B1 | 12/2002 | Kellogg et al. | |
| 6,502,595 B2 | 1/2003 | Louie | |
| 6,516,751 B2 | 2/2003 | Burns | |
| 6,527,136 B1 | 3/2003 | Sabounjian | |
| 6,585,414 B2 | 7/2003 | Peska | |
| 6,604,537 B2 | 8/2003 | Zheng | |
| 6,668,847 B2 | 12/2003 | Zheng | |
| 6,681,720 B1 | 1/2004 | Skurdalsvold et al. | |
| 6,688,256 B1 | 2/2004 | King | |
| 6,698,382 B1 | 3/2004 | Blaszak et al. | |
| 6,702,119 B2 | 3/2004 | Sabounjian | |
| 6,705,338 B2 | 3/2004 | Zheng | |
| 6,708,742 B2 | 3/2004 | Weathers et al. | |
| 6,715,446 B2 | 4/2004 | Chou | |
| D494,367 S | 8/2004 | Yang | |
| 6,782,905 B2 | 8/2004 | Chu et al. | |
| RE38,591 E | 9/2004 | Kellogg et al. | |
| D501,063 S | 1/2005 | Bertolli | |
| 6,848,460 B2 | 2/2005 | Zheng | |
| 6,851,136 B2 | 2/2005 | Brereton | |
| 6,866,009 B2 | 3/2005 | Smith, Jr. et al. | |
| 6,874,797 B2 | 4/2005 | Gardenour | |
| 6,899,057 B1 | 5/2005 | Chrisco | |
| 6,901,940 B2 | 6/2005 | Zheng | |
| 6,926,020 B2 | 8/2005 | Zheng | |
| 6,948,632 B2 | 9/2005 | Kellogg et al. | |
| D512,799 S * | 12/2005 | Simpson | A01K 1/0254 D30/108 |
| 6,974,167 B2 | 12/2005 | Springs, II | |
| 6,983,965 B1 | 1/2006 | Bergell | |
| D514,747 S | 2/2006 | Bertoli et al. | |
| 6,997,138 B1 | 2/2006 | Simpson | |
| 6,997,338 B2 | 2/2006 | Sabounjian | |
| D518,243 S | 3/2006 | Weidner | |
| 7,014,096 B2 | 3/2006 | Hinds | |
| D519,280 S | 4/2006 | Kellogg et al. | |
| 7,021,242 B2 | 4/2006 | Axelrod | |
| 7,044,083 B2 | 5/2006 | Farmer | |
| 7,044,277 B2 | 5/2006 | Redzisz | |
| 7,066,647 B2 | 6/2006 | Peska | |
| D524,995 S | 7/2006 | Dudas | |
| 7,077,147 B2 | 7/2006 | Louie et al. | |
| 7,111,634 B2 | 9/2006 | Louie | |
| 7,137,399 B1 | 11/2006 | Ransom et al. | |
| 7,143,553 B2 | 12/2006 | Fritsche | |
| D536,872 S | 2/2007 | Kellogg et al. | |
| 7,178,538 B2 | 2/2007 | Ransom | |
| 7,228,820 B1 | 6/2007 | Kellogg et al. | |
| D547,950 S | 8/2007 | Kellogg et al. | |
| D551,452 S | 9/2007 | Kellogg et al. | |
| D555,854 S | 11/2007 | Kamiya | |
| D555,905 S | 11/2007 | Kellogg et al. | |
| D571,054 S | 6/2008 | Donnelly | |
| 7,472,715 B2 | 1/2009 | Zheng | |
| 7,481,182 B2 | 1/2009 | Simpson | |
| 7,484,520 B2 | 2/2009 | Zheng | |
| 7,523,719 B2 | 4/2009 | Miller | |
| D601,800 S | 10/2009 | Kellogg et al. | |
| 7,607,446 B2 | 10/2009 | Zheng | |
| D610,352 S | 2/2010 | Kellogg et al. | |
| D612,117 S | 3/2010 | Krotts et al. | |
| 7,703,228 B2 | 4/2010 | Zheng | |
| 7,703,416 B2 | 4/2010 | Farmer et al. | |
| 7,721,678 B2 | 5/2010 | Jakubowski et al. | |
| D622,466 S | 8/2010 | Sabounjian | |
| D622,960 S | 9/2010 | Sabounjian | |
| 7,789,044 B2 * | 9/2010 | McGrade | A01K 1/0254 119/496 |
| 7,802,540 B2 * | 9/2010 | Jakubowski | A01K 1/0254 119/497 |
| D625,891 S | 10/2010 | Krotts et al. | |
| 7,845,507 B2 | 12/2010 | Kellogg et al. | |
| 7,938,085 B1 | 5/2011 | Tsengas | |
| 8,047,391 B2 * | 11/2011 | Lu | A01K 1/03 220/4.28 |
| 8,127,719 B2 | 3/2012 | Jakubowski et al. | |
| 8,171,888 B2 | 5/2012 | Chou | |
| 8,176,877 B2 | 5/2012 | Lamstein | |
| D661,900 S | 6/2012 | Krotts | |
| D662,264 S | 6/2012 | Chau et al. | |
| D670,112 S | 11/2012 | Malone | |
| D680,329 S | 4/2013 | Krotts | |
| D685,139 S | 6/2013 | Park | |
| D691,688 S | 10/2013 | Pescovitz | |
| D691,689 S | 10/2013 | Pescovitz | |
| D691,690 S | 10/2013 | Pescovitz | |
| D703,895 S | 4/2014 | Wang | |
| D706,507 S | 6/2014 | Duvigneau | |
| D711,107 S | 8/2014 | Krotts | |
| D721,232 S | 1/2015 | Krotts | |
| D739,656 S | 9/2015 | Krotts | |
| 2002/0100431 A1 * | 8/2002 | Sherman | A01K 1/034 119/499 |
| 2002/0112753 A1 | 8/2002 | Louie | |
| 2003/0127059 A1 | 7/2003 | Smith, Jr. et al. | |
| 2003/0213511 A1 | 11/2003 | Louie | |
| 2003/0221924 A1 | 12/2003 | Tong | |
| 2004/0129307 A1 | 7/2004 | Louie et al. | |
| 2005/0229866 A1 * | 10/2005 | Simpson | A01K 1/0245 119/499 |
| 2006/0112621 A1 | 6/2006 | White | |
| 2006/0150917 A1 | 7/2006 | Morton | |
| 2006/0174841 A1 | 8/2006 | Axelrod | |
| 2006/0186119 A1 | 8/2006 | Zheng | |
| 2006/0213452 A1 | 9/2006 | King | |
| 2007/0079548 A1 | 4/2007 | Bakowski | |
| 2007/0251463 A1 * | 11/2007 | Lu | A01K 1/03 119/452 |
| 2008/0072837 A1 | 3/2008 | Redzisz et al. | |
| 2008/0245313 A1 | 10/2008 | Jakubowski et al. | |
| 2009/0090709 A1 | 4/2009 | Shalomoff | |
| 2009/0101075 A1 | 4/2009 | Matlack | |
| 2009/0314219 A1 | 12/2009 | Bryson | |
| 2010/0018968 A1 | 1/2010 | Sabounjian | |
| 2010/0089336 A1 | 4/2010 | Flannery et al. | |
| 2010/0313824 A1 | 12/2010 | Northrop | |
| 2011/0174233 A1 | 7/2011 | Lush | |
| 2011/0174811 A1 | 7/2011 | Sabounjian | |
| 2011/0308476 A1 | 12/2011 | Chang | |
| 2012/0186533 A1 | 7/2012 | Lu | |
| 2016/0014994 A1 * | 1/2016 | Ma | A01K 1/0254 119/498 |

FOREIGN PATENT DOCUMENTS

| | | |
|---|---|---|
| DE | 30 13 178 | 11/1981 |
| DE | 41 14 916 | 11/1991 |
| FR | 589062 | 5/1925 |
| FR | 1215335 | 11/1959 |
| FR | 1380728 | 12/1964 |
| FR | 1380738 | 2/1990 |
| FR | 2635136 | 2/1990 |
| GB | 1367 | 0/1871 |
| GB | 5939 | 0/1915 |
| GB | 140570 | 4/1920 |
| GB | 2097244 A | 11/1982 |

(56) References Cited

FOREIGN PATENT DOCUMENTS

| GB | 2126535 | 3/1984 |
| GB | 2212114 | 7/1989 |
| JP | 6-42227 | 2/1994 |

OTHER PUBLICATIONS

Playhut brochure, date unknown.
Eileen Edinger letter, dated May 25, 1993.
Eileen Edinger Douglas letter, dated Aug. 26, 1996.
Patent Application re: prior art product sold in U.S. by Stephen A. Fausel and Paul S. Ziglar; specification for Collapsible Furniture, Jun. 1985.
Precision Pet Soft Side Pet Crate, www.petsupplies.com, dated Mar. 6, 2013, 2 pages.
Generation II Portable Soft Dog Crate, www.petsupplies.com, dated Mar. 6, 2013, 2 pages.
Twist n Go Softsided Dog Kennel, ww.pet-discount-store.com, dated Mar. 6, 2013, 2 pages.
SportPet Pop-Open Kennel, Small, www.walmart.com, dated Mar. 6, 2013, 1 page.
Boots & Barkley® Large Pop Open Dog Kennel www.target.com, dated Mar. 6, 2013, 1 page.
Twist-N-Go Kennel, Lg., www.waremfginc.com , dated Mar. 6, 2013, 2 pages.

* cited by examiner

PET KENNEL

BACKGROUND OF THE INVENTION

To many people, pets are considered members of the family and therefore should be included in all family activities, whether it's grilling out in the backyard or relaxing in a park. Generally, this may also mean that there needs to be a place in which the pet can be go for shade or for safe keeping.

Pet kennels are well known in the art, however, many are bulky solid structures that take up a lot of room when in use and also when not in use. Collapsible pet kennels may provide some convenience but are too unstable to provide the type of structure preferred in some situations and/or environments. Accordingly, the art of pet kennels could benefit from a pet kennel capable of collapsing for ease of transporting and storing the kennel, yet capable of providing a rigid frame to provide added strength to the kennel.

SUMMARY OF THE INVENTION

The present invention relates to a pet kennel capable of collapsing for transporting or storing the kennel, and also provides a rigid frame for added strength when in use.

One object of the present invention is to provide a collapsible pet kennel having a base framework; a first framework and a second framework opposite the first framework, each extending from, and pivotably affixed to, the base framework; a first swing arm pivotably attached to the first framework and removably engageable with the second framework; a second swing arm pivotably attached to the second frame work and removably engageable with the first framework; a covering extending substantially across the base framework, the first framework, the second framework, and between the first and second frameworks defining a plurality of surface members; whereby the covering is removably attachable to the first and second swing arms; and wherein a door is located in at least one of the plurality of surface members.

The base framework may have a plurality of interconnected base members and the covering may have a plurality of channels located at the intersections of the surface members extending across and from the base framework through which the base members are placed.

The first framework may have a plurality of first framework members and the second framework may have a plurality of second framework members. The covering may also have a plurality of channels located at the intersections of the surface members extending across and from the first and second framework members through which the first framework members and the second framework members are placed.

At least one of the plurality of surface members may have a window.

Another object of the present invention is to provide a collapsible pet kennel having a base framework with four elongate base members forming a closed loop connected end-to-end by a plurality of three-way corner pieces; a first framework having a first framework first upstanding member, a first framework second upstanding member, a first framework lateral member, and a first framework swing arm; a second framework having a second framework first upstanding member, a second framework second upstanding member, a second framework lateral member, and a second framework swing arm; a plurality of in-line hinge connectors affixed between each of the plurality of corner pieces and the respective first framework first and second upstanding members and the second framework first and second upstanding members; a first clip connector and a second clip connector, each having a first clip connector port, a second clip connector port, and a third clip connector port with a biasable opening; a first pivot connector and a second pivot connector, each having a first pivot connector port, a second pivot connector port, and a third pivot connector port pivotably attached by a pivot member; the first framework first upstanding member affixed to the first clip connector first port, the first framework second upstanding member affixed to the first pivot connector first port, the first framework lateral member affixed to the first clip connector second port and the first pivot connector second port, and the first framework swing arm affixed to the first pivot connector third port; the second framework first upstanding member affixed to the second clip connector first port, the second framework second upstanding member affixed to the second pivot connector first port, the second framework lateral member affixed to the second clip connector second port and the second pivot connector second port, and the second framework swing arm affixed to the second pivot connector third port; the first framework swing arm removably engageable with the biasable opening of the second clip connector third port; the second framework swing arm removably engageable with the biasable opening of the first clip connector third port; a covering extending substantially across the base framework, the first framework, the second framework, and between the first and second frameworks defining a plurality of surface members; wherein the covering is removably attachable to the first and second framework swing arms; and wherein a door is located in at least one of the plurality of surface members.

The door may be located in the surface member located between the first framework second upstanding member, the first framework swing arm, the second framework first upstanding member, and the corresponding base member.

The covering may have a plurality of channels located at the intersections of the surface members through which the first framework upstanding members and lateral member, second framework upstanding members and lateral member, and base framework base members are placed.

At least one of the plurality of surface members may have a window.

Another object of the present invention is to provide a method for erecting a collapsible pet kennel, the method comprising the steps of: providing a collapsible pet kennel comprising a base framework; a first framework and a second framework opposite the first framework, each extending from, and pivotably affixed to, the base framework by a plurality of in-line hinge connectors; a first framework swing arm pivotably attached to the first framework by a first framework pivot connector and removably engageable with the second framework at a second framework clip connector; a second framework swing arm pivotably attached to the second framework by a second framework pivot connector and removably engageable with the first framework at a first framework clip connector; a covering extending substantially across the base framework, the first framework, the second framework, and between the first and second frameworks defining a plurality of surface members; whereby the covering is removably attachable to the first and second swing arms; and whereby the first swing arm is positioned against the first framework, the second swing arm is positioned against the second framework, the first framework is positioned across the base framework, and the second framework is positioned across the first framework; rotating the second framework away from the first framework about the in-line hinge connectors; rotating the first framework away from the base framework about the in-line hinge connectors; rotating the first framework swing arm away from the first framework; engaging the first framework swing arm within the second framework clip connector; attaching the covering to the first framework swing arm; rotating the second framework swing arm away from the second framework; engaging the second framework swing arm within the first framework clip connector; and attaching the covering to the second framework swing arm.

The first and second framework clip connectors may have a biasable opening. Further, the first and second framework swing arms may be attached to the covering with a plurality of interfacing hook and loop fasteners.

The base framework may have a plurality of interconnected base members, and the covering may have a plurality of channels located at the intersections of the surface members extending across or from the base framework through which the base members are placed.

The first framework may have a plurality of first framework members and the second framework may have a plurality of second framework members. The covering may further have a plurality of channels located at the intersections of the surface members extending across or from the first and second frameworks through which the first framework members and the second framework members are placed.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
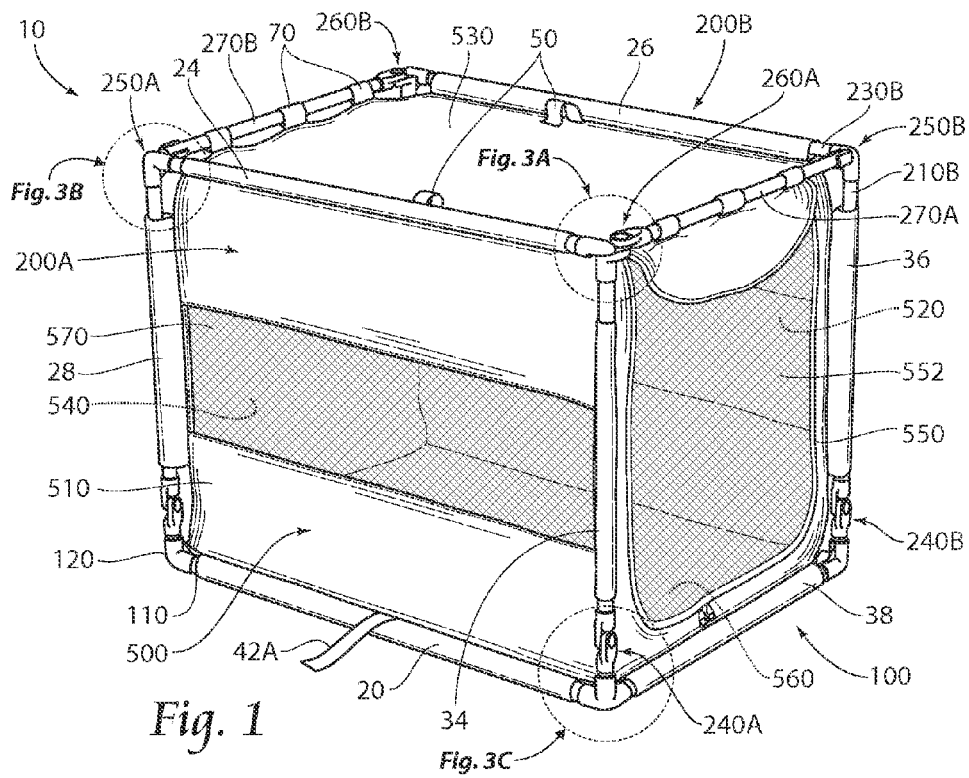
FIG. 1 is a perspective view of the pet kennel according to the present invention.
Figure 8:
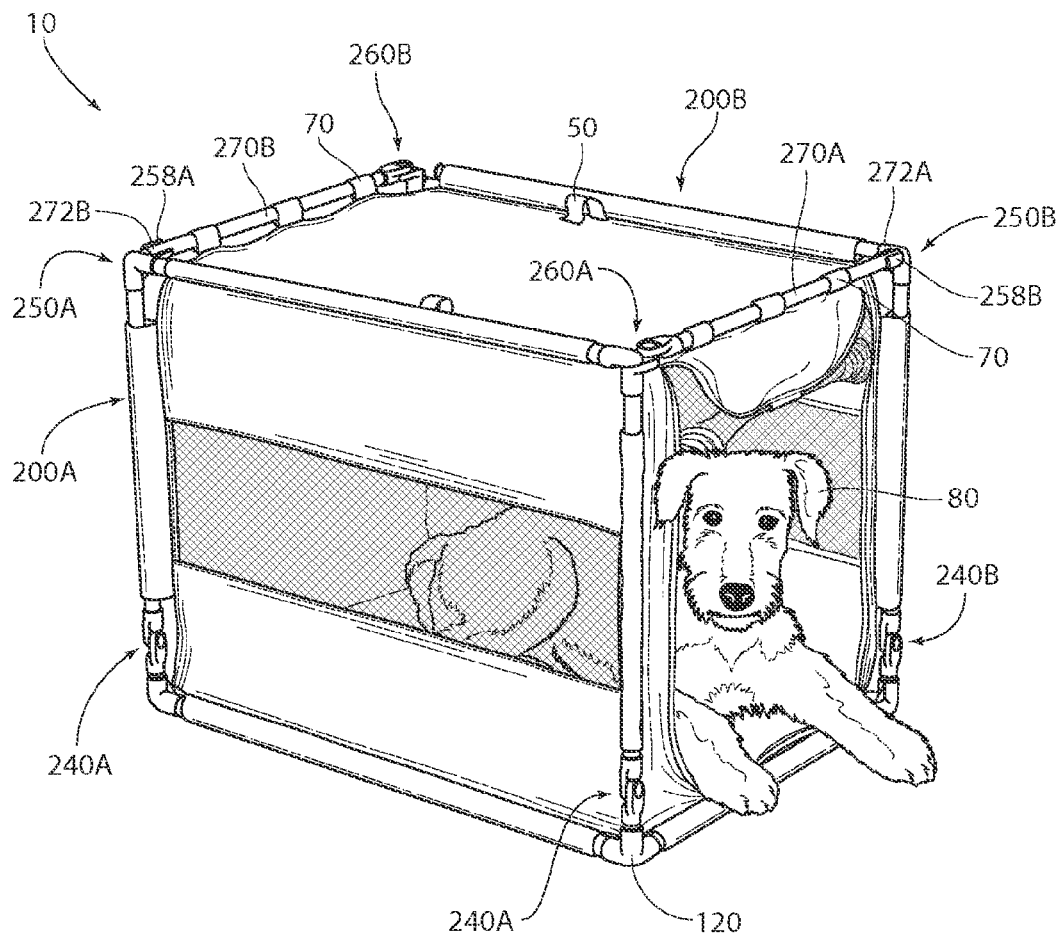

A preferred embodiment 10 of the pet kennel according to the present invention is shown in FIG. 1 and is shown housing a pet 80 in FIG. 8. The pet kennel 10 is depicted in a fully configured and upstanding orientation. The pet kennel 10 comprises a base framework 100, a first framework 200A, a second framework 200B, a first swing arm 270A, a second swing arm 270B, and a covering 500.

Figure 2A:
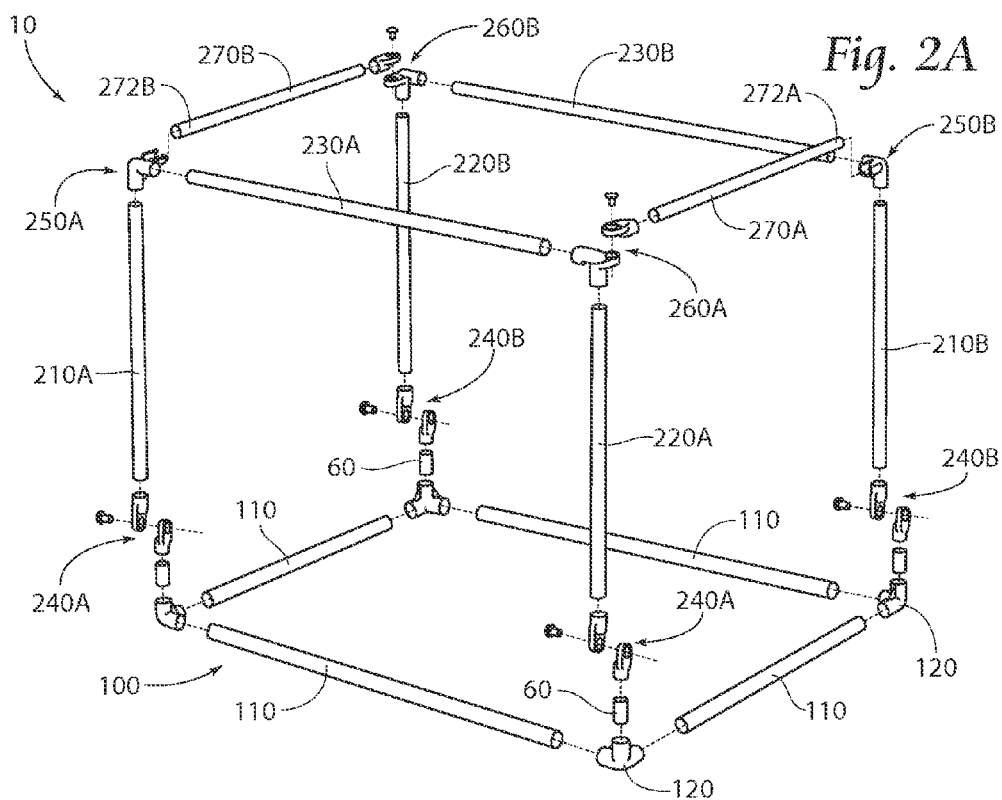
FIG. 2A is an exploded view of the framework of the pet kennel shown in FIG. 1.
Figure 2B:
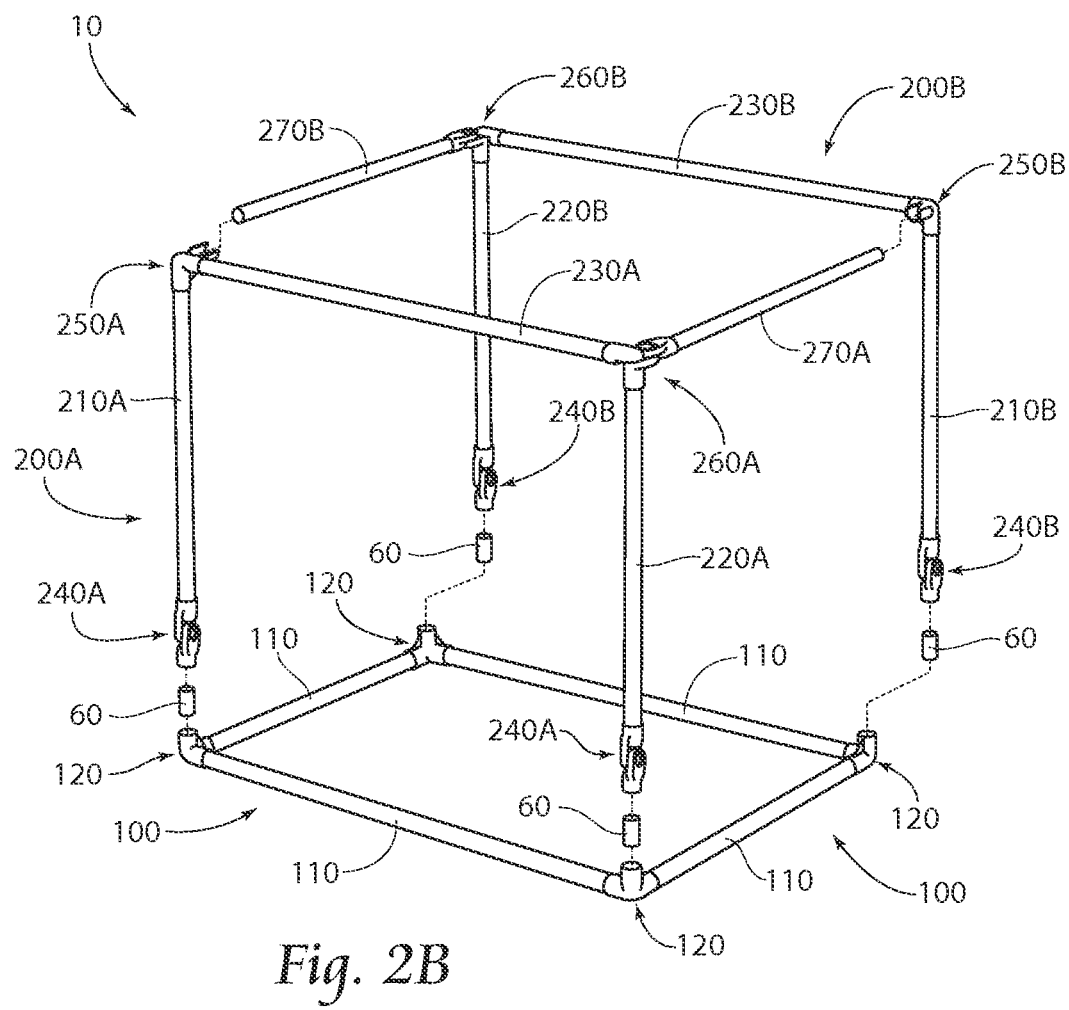
FIG. 2B is a partially exploded view of the framework of the pet kennel shown in FIG. 1.

The base framework 100, as shown more clearly in FIGS. 2A and 2B, comprises a plurality of pipe-like base members 110 and a plurality of corner pieces 120 for receiving and joining the base members 110 together. Preferably, the base framework 100 comprises four elongate base members 110, the corner pieces 120 comprise three-way elbows or the like, and the joined base members 110 form a rectangle.

The first and the second frameworks 200A, 200B are substantially similar and therefore, for the sake of brevity, the following description should be construed as applicable to both the first and the second frameworks 200A, 200B, however, only the first framework 200A will be described with some reference to the second framework 200B in regards to the interaction between the frameworks 200A, 200B.

The first framework 200A preferably comprises a first upstanding member 210A, a second upstanding member 220A, a lateral member 230A extending between the first upstanding member 210A and the second upstanding member 220A, a pair of in-line hinge connectors 240A (See FIG. 3C), a clip connector 250A, a pivot connector 260A, and a swing arm 270A.

Figure 3A:
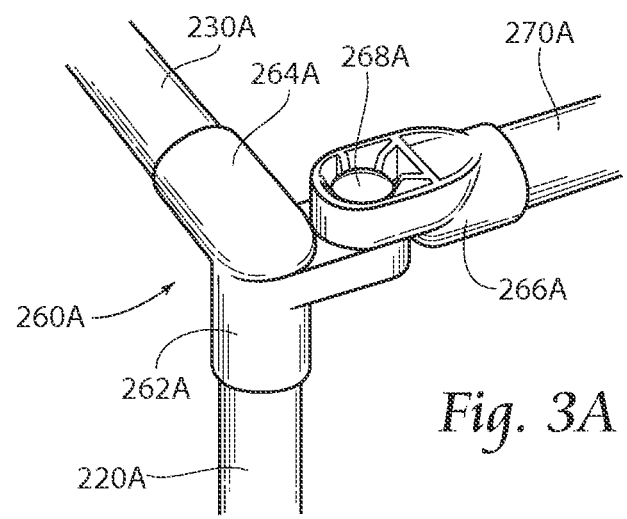
FIG. 3A is a close-up view of the pet kennel within section 3A of FIG. 1.
Figure 3B:
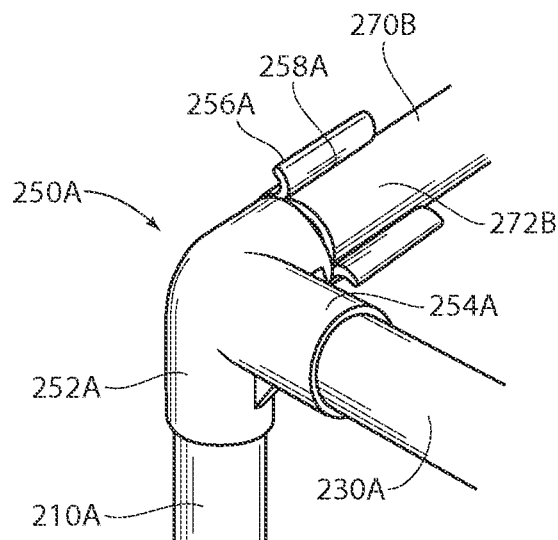
FIG. 3B is close-up view of the pet kennel within section 3B of FIG. 1.
Figure 3C:
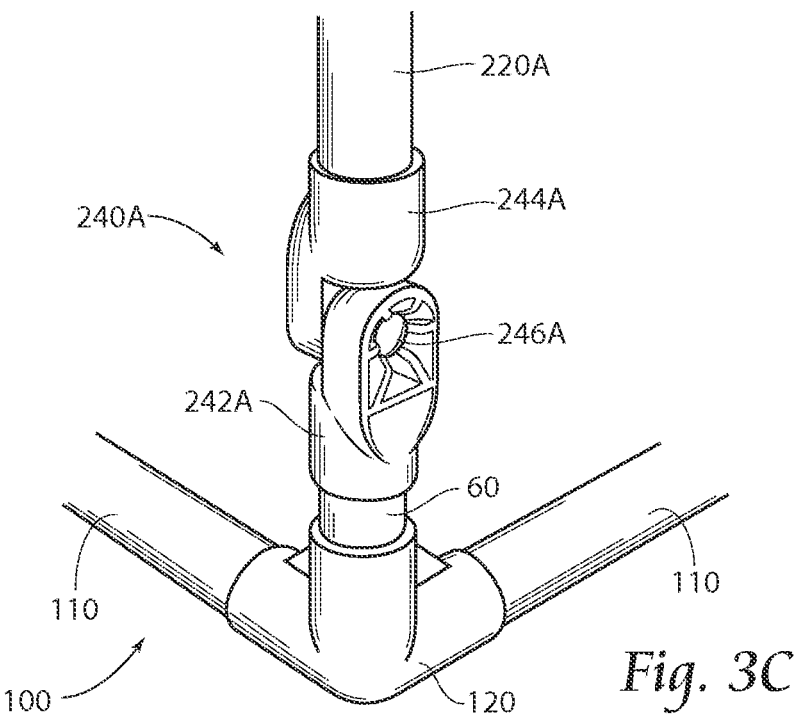
FIG. 3C is a close-up view of the pet kennel within section 3C of FIG. 1.

Now referring to FIG. 3C, each of the in-line hinge connectors 240A preferably comprise a first in-line connector port 242A hingedly affixed to a second in-line connector port 244A via a hinge member 246A. The first in-line connector port 242A is attached to the base framework 100 approximately at or near the corner pieces 120. As shown here, the in-line hinge connector 240A is joined to the corner pieces 120 by a nipple 60 received within the corner piece 120 and within the first in-line connector port 242A. It is preferable that the in-line hinge connectors 240A provide a hinge point at a position between the corner pieces 120 and the midpoint of the respective upstanding member 210A, 220A (See FIG. 2B).

Received within each of the second in-line connector ports 244A is the first framework first and second upstanding members 210A, 220A. The first framework first upstanding member 210A preferably terminates in a clip connector 250A (See FIG. 3B). The clip connector 250A preferably comprises a three-way elbow having a first clip connector port 252A, a second clip connector port 254A, and a third clip connector port 256A, all projecting outwardly away from each other in three different directions at approximately 90 degrees, or isometrically.

The first and second clip connector ports 252A, 254A are preferably cylindrical and are configured to receive the first framework first upstanding member 210A and the first framework lateral member 230A, respectively, coaxially therein. The third clip connector port 256A is sized and configured to have a biasable opening 258A about a portion of the periphery to receive the distal end portion 272B of the swing arm 270B of the second framework 200B (See FIG. 3B).

The opening 258A expands upon applying force to the swing arm distal end portion 272B against the opening 258A and whereby the third clip connector port 256A will substantially retain the original shape after the swing arm distal end portion 272B passes through and into the third clip connector port 256A. The same biasing force must be overcome when removing the swing arm distal end portion 272B from the third clip connector port 256A.

The first framework second upstanding member 220A preferably terminates in a pivot connector 260A (See FIG. 3A). The pivot connector 260A preferably comprises a three-way elbow having a first pivot connector port 262A, a second pivot connector port 264A, and a third pivot connector port 266A, all projecting outward from each other in three different directions at approximately 90 degrees, or isometrically.

The first and second pivot connector ports 262A, 264A are preferably cylindrical and are configured to receive the first framework second upstanding member 220A and the first framework lateral member 230A, respectively, coaxially therewith. The third pivot connector port 266A has a pivot member 268A connecting the third pivot connector port 266A to or near the junction of the first and second pivot connector ports 262A, 264A.

The third connector port 266A of the pivot connector 260A is sized and configured to receive the swing arm 270A therein and permits the swing arm 270A to rotate about the pivot member 268A in the direction of the adjacent first framework lateral member 230A.

Looking back to FIG. 1, the pet kennel 10 is shown having a covering 500. The covering 500 preferably extends substantially across the base and the first and second frameworks 200A, 200B and between the first and second frameworks 200A, 200B to completely enclose the pet kennel 10 and define a plurality of surface members: a first surface member 510, a second surface member 520, a third surface member 530, a fourth surface member 540, a fifth surface member 550, and a base surface member 560.

The base surface member 560 extends substantially across the base framework 100 from and between the base members 110. The first surface member 510 extends substantially from and between the first framework first and second upstanding members 210A, 220A and substantially from and between the adjacent base member 110 and the first framework lateral member 230A.

At the intersection of the base surface member 560 and the first surface member 510 a channel 20 preferably extends therefrom through which the corresponding base member 110 may pass.

The second surface member 520 extends substantially from and between the second framework first and second upstanding members 210B, 220B and from and between the adjacent base member 110 and the second framework lateral member 230B.

At the intersection of the second surface member 520 and the base surface member 560 a channel 22 (hidden) preferably extends therefrom through which the corresponding base member 110 may pass.

The third surface member 530 extends substantially from and between the first framework lateral member 230A and the second framework lateral member 230B and substantially from and between the first and second swing arms 270A, 270B when the first and second swing arms 270A, 270B are installed within their respective clip connector 250A, 250B.

At the intersection of the third surface member 530 and the first surface member 510 a channel 24 preferably extends therefrom through which the corresponding first framework lateral member 230A may pass. At the intersection of the third surface member 530 and the second surface member 520 a channel 26 extends therefrom through which the corresponding second framework lateral member 230B may pass.

The connection of the third surface member 530 to the first and second framework swing arms 270A, 270B is preferably achieved with a plurality of support fasteners 70. The connection is preferably a reversible one. As shown here, the support fasteners 70 comprise a plurality of hook and loop strap pairs; however, any type of removable connector may be used, including, but not limited to, elastically biased hooks (not shown).

The fourth surface member 540 extends substantially from and between the first framework first upstanding member 210A and the second framework second upstanding member 220B, and substantially from and between the adjacent base member 110 and the second framework swing arm 270B.

At the intersection of the fourth surface member 540 and the first surface member 510 a channel 28 preferably extends therefrom through which the corresponding first framework first upstanding member 210A may pass. At the intersection of the fourth surface member 540 and the second surface member 520 a channel 30 (hidden) preferably extends therefrom through which the corresponding second framework second upstanding member 220B may pass. At the intersection of the fourth surface member 540 and the base surface member 560, a channel 32 (hidden) preferably extends therefrom through which the corresponding base member 110 may pass.

The connection of the fourth surface member 540 to the second framework swing arm 270B is preferably achieved through the support fasteners 70 which also connect the third surface member 530 to the second framework swing arm 270B.

The fifth surface member 550 extends substantially from and between the first framework second upstanding member 220A and the second framework first upstanding member 210B, and substantially from and between the adjacent base member 110 and the first framework swing arm 270A.

At the intersection of the fifth surface member 550 and the first surface member 510 a channel 34 preferably extends therefrom through which the corresponding first framework second upstanding member 220A may pass. At the intersection of the fifth surface member 550 and the second surface member 520 a channel 36 preferably extends therefrom through which the corresponding second framework first upstanding member 210B may pass. At the intersection of the fifth surface member 550 and the base surface member 560, a channel 38 preferably extends therefrom through which the corresponding base member 110 may pass.

The connection of the fifth surface member 550 to the first framework swing arm 270A is preferably achieved through the support fasteners 70 which also connect the third surface member 530 to the first framework swing arm 270A.

A door 552 is preferably located within the fifth surface member 550. The entry door 552 is preferably a closeable door. For example, the embodiment shown here employs a zipper which may be used to open and close the door 552.

Additionally or alternatively, mesh windows 570 may be included within the first, second, and fourth surface members 510, 520, 540. The entry door 552 may also comprises a mesh-type material. It should be noted that other types of material which allow air to pass through the pet kennel 10 are also contemplated.

Figure 4:
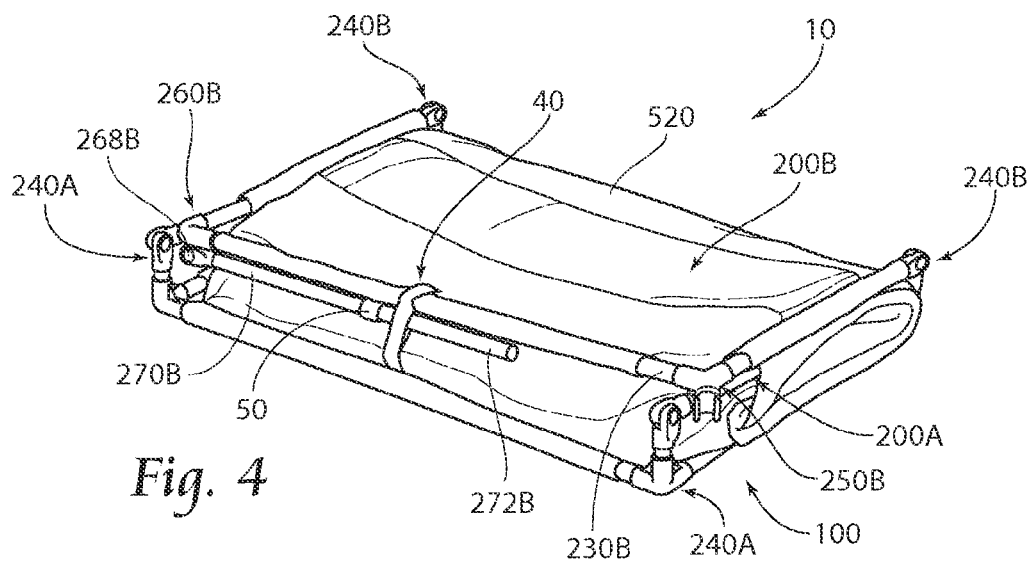
FIGS. 4-8 depict a progressive method of erecting the pet kennel of FIG. 1 according to the present invention.

Looking now to FIGS. 4-8, the process of transforming the pet kennel 10 from the collapsed configuration (FIG. 4) to the fully assembled configuration (FIG. 8) is shown. FIG. 4 illustrates the step of providing a pet kennel 10 according to the present invention in a collapsed configuration. In this state, the second framework swing arm 270B is rotated about the pivot member 268B and is positioned against the second framework lateral member 230B and the first framework swing arm 270A (hidden) is pivoted about the pivot member 268A (hidden) and positioned against the first framework lateral member 230A (hidden). The first framework 200A is positioned over the base framework 100, and the second framework 200B is positioned over the first framework 200A. It is contemplated that the position order of the first framework 200A and the second framework 200B may be reversed.

A retaining device 40 may be employed to maintain the pet kennel 100 in the collapsed position (FIG. 4). In the embodiment shown, a hook and loop type mating pair of straps 42A, 42B are used, whereby a first strap 42A is attached approximately at or near the channel 20 between the base surface member 560 and the first surface member 510 and a second strap 42B is attached approximately at or near the channel 26 between the second surface member 520 and the third surface member 530. Whereby, when the pet kennel 10 is in the collapsed position, the first strap 42A is adjacent to the second strap 42B and the two straps 42A, 42B can be interfaced together.

Figure 5:
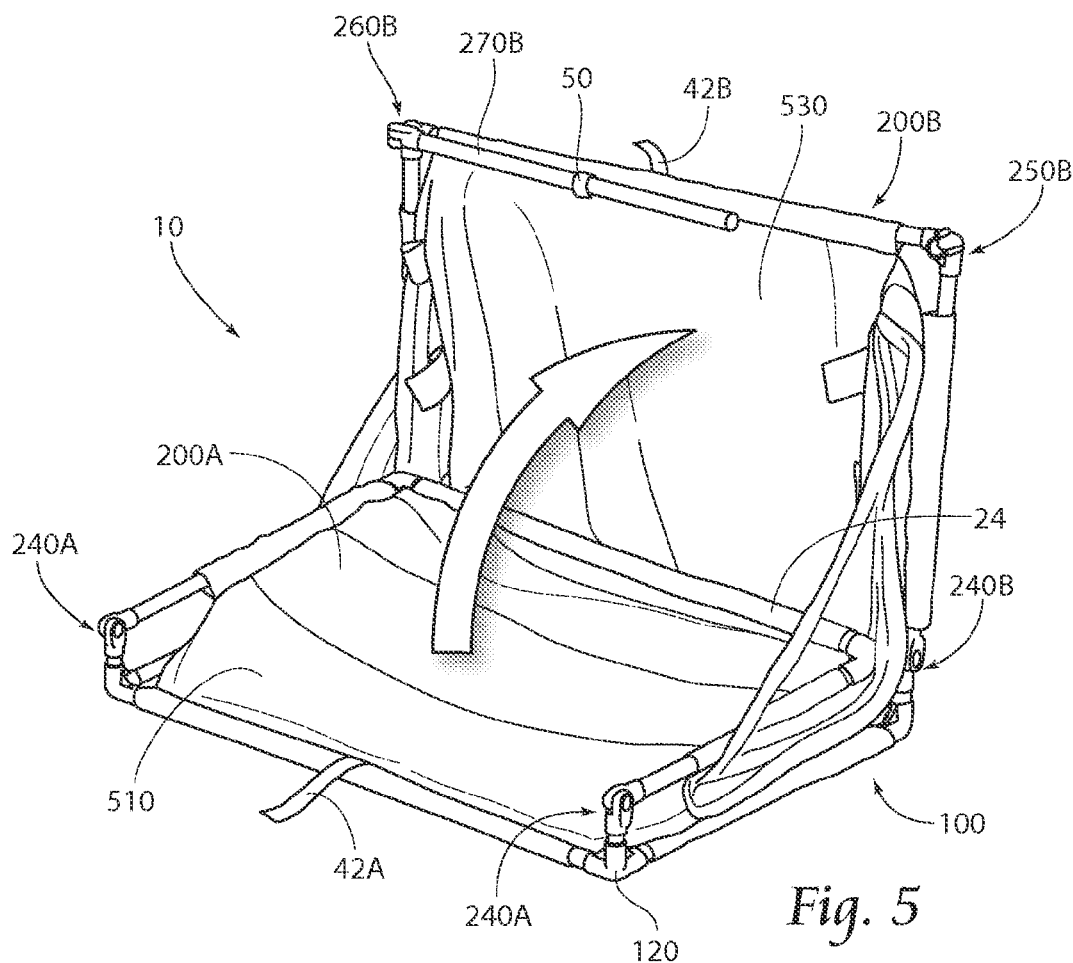

FIG. 5 illustrates rotating the second framework 200B about the second framework in-line hinge connectors 240B away from the first framework 200A to a position substantially perpendicular with the base framework 100.

Additionally or alternatively, as shown in FIG. 5, swing arm straps 50 are provided to retain the swing arms 270A, 270B from pivoting during the assembly or collapsing process. Preferably the swing arm straps 50 comprise a hook and loop type strap (see FIG. 7). The straps 50 for the first framework swing arm 270A are preferably attached at or near the third surface member 530 side of the channel 24 between the first surface member 510 and the third surface member 530. The straps 50 for the second framework swing arm 270B are preferably attached at or near the third surface member 530 side of the channel 26 between the second surface member 520 and the third surface member 530.

Figure 6:
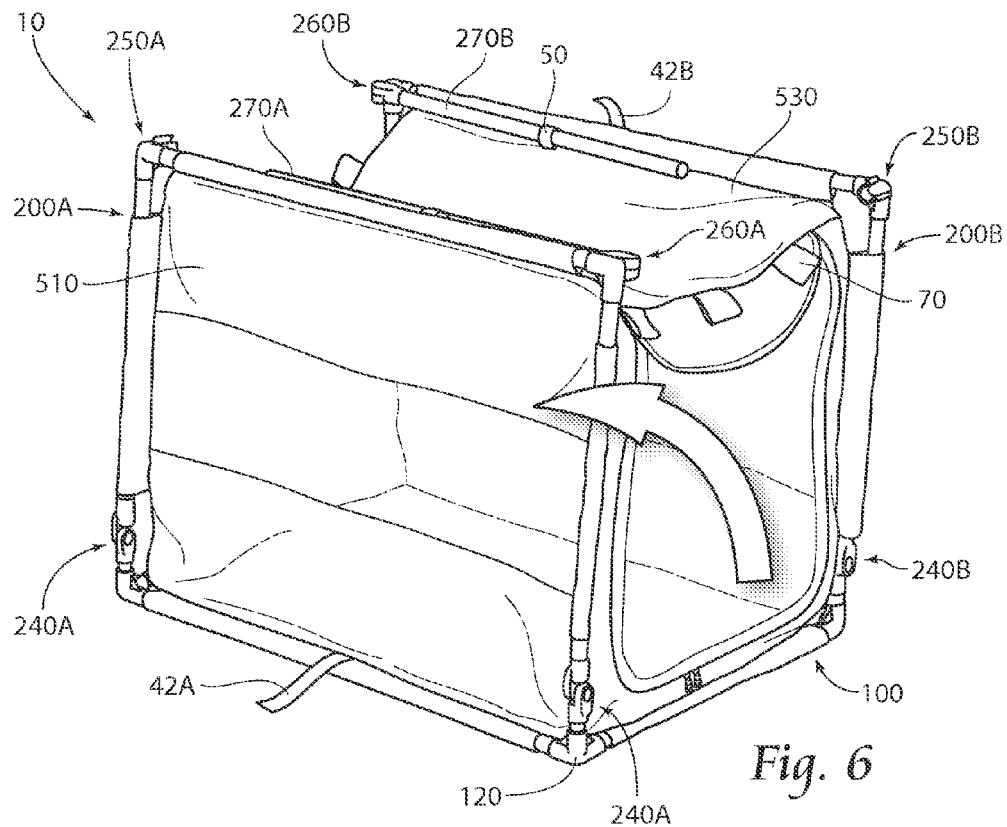

FIG. 6 illustrates rotating the first framework 200A about the first framework in-line hinge connectors 240A away from the base framework 100 to a position substantially perpendicular to the base framework 100 and substantially parallel with the second framework 200B.

Figure 7:
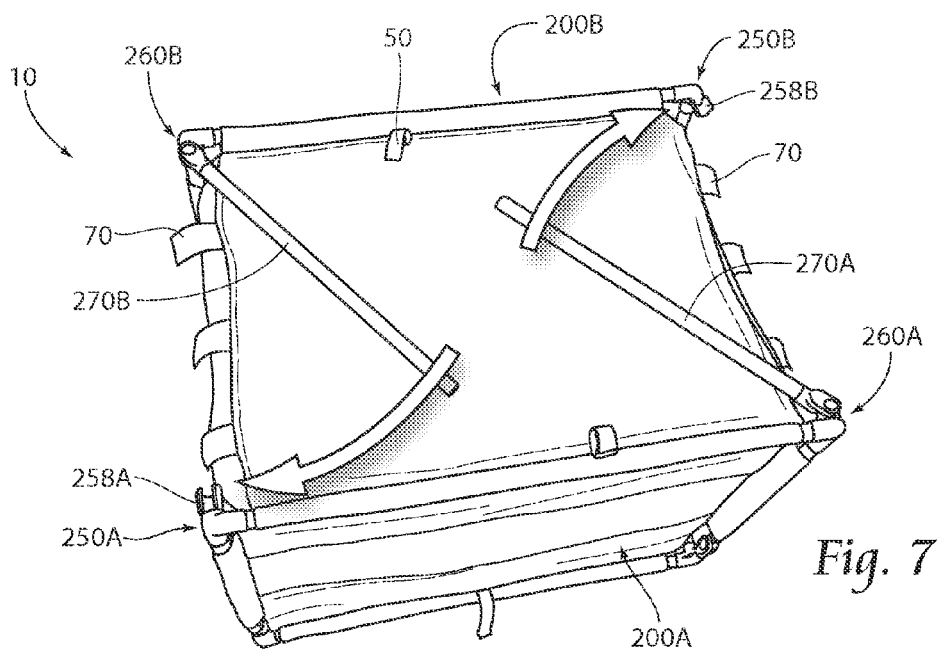

FIG. 7 shows the step of rotating the first framework swing arm 270A away from the first framework lateral member 230A about the first framework pivot connector 260A towards the second framework clip connector 250B and rotating the second framework swing arm 270B away from the second framework lateral member 230B about the second framework pivot connector 260B and towards the first framework clip connector 250A.

FIG. 8 illustrates the steps of inserting the first and second framework swing arm distal end portions 272A, 272B into the corresponding clip connectors 250A, 250B and affixing each support fasteners about the respective swing arm 270A, 270B.

It should be noted that the steps put forth above may be reversed to collapse the pet kennel 10 to place it back into the configuration as shown in FIG. 4.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A collapsible pet kennel comprising:
a base framework comprising base members connected by static three-way corner pieces;
a first framework comprising a first framework first upstanding member, a first framework second upstanding member, a first framework lateral member extending between the first framework first and second members, a first pair of first framework in-line hinge connectors pivotably connecting each of the first framework first upstanding member and the first framework second upstanding member to one of the static three-way corner pieces of the base framework through a nipple;
a second framework, opposite the first framework, comprising a second framework first upstanding member, a second framework second upstanding member, a second framework lateral member extending between the second framework first and second members, a second pair of second framework in-line hinge connectors pivotably connecting each of the second framework first upstanding member and the second framework second upstanding member to one of the static three-way corner pieces of the base framework through a nipple;
a first swing arm pivotably attached to the first framework and removably engageable with the second framework;
a second swing arm pivotably attached to the second frame work and removably engageable with the first framework;
a covering extending substantially across the base framework, the first framework, the second framework, and between the first and second frameworks defining a plurality of surface members;
whereby the covering is removably attachable to the first and second swing arms; and
wherein a door is located in at least one of the plurality of surface members.

2. The collapsible pet kennel of claim 1, wherein the coveting comprises a plurality of channels through which the base members are placed.

3. The collapsible pet kennel of claim 1, wherein the covering comprises a plurality of channels through which the first framework members and the second framework members are placed.

4. The collapsible pet kennel of claim 1, wherein at least one of the plurality of surface members comprises a window.

5. A collapsible pet kennel comprising:
a base framework having four elongate base members forming a closed loop connected end-to-end by static three-way corner pieces;
a first framework having a first framework first upstanding member, a first framework second upstanding member, a first framework lateral member extending between the first framework first and second upstanding member, a first pair of first framework in-line hinge connectors pivotably connecting each of the first framework first upstanding member and the first framework second upstanding member to one the static three-way corner pieces of the base framework through a nipple, a first framework clip connector joining the first framework first upstanding member and the first framework lateral member, a first framework pivot connector joining the first framework second upstanding member and the first framework lateral member, and a first framework swing arm pivotally extending from the first framework pivot connector;
a second framework having a second framework first upstanding member, a second framework second upstanding member, a second framework lateral member extending between the second framework first and second upstanding members, a second pair of second framework in-line hinge members pivotably connecting each of the second framework first upstanding member and the second framework second upstanding member to one of the static three-way corner pieces of the base framework through a nipple, a second framework clip connector joining second framework first upstanding member and the second framework lateral member, a second framework pivot connector joining the second framework second upstanding member and the second framework lateral member, and a second framework swing arm pivotably extending from the second framework pivot connector;

the first framework clip connector comprises a connector port with a biasable opening configured to removably receive the second framework swing arm;

the second framework clip connector comprises a connector port with a biasable opening configured to removably receive the first framework swing arm;

a covering extending substantially across the base framework, the first framework, the second framework, and between the first and second frameworks defining a Plurality of surface members;

wherein the covering is removably attachable to the first and second framework swing arms; and wherein a door is located in at least one of the plurality of surface members.

6. The pet kennel of claim 5, wherein the door is located between the first framework second upstanding member, the first framework swing arm, the second framework first upstanding member, and the corresponding base member.

7. The collapsible pet kennel of claim 6, wherein the covering comprises a plurality of channels located at the intersections of the surface members through which the first framework upstanding members and lateral member, second framework upstanding members and lateral member, and base framework base members are placed.

8. The collapsible pet kennel of claim 5, wherein at least one of the plurality of surface members comprises a window.

9. A method for erecting a collapsible pet kennel, the method comprising the steps of:

providing a collapsible pet kennel comprising:

a base framework, comprising base members connected by static three-way corner pieces;

a first framework comprising a first framework first upstanding member, a first framework second upstanding member, and a first framework lateral member extending between the first framework first and second upstanding, members, a first pair of first framework in-line hinge connectors pivotably connecting each of the first framework first upstanding member and the first framework second upstanding member to one of the static three-way corner pieces of the base framework through a nipple, a first framework clip connector joining the first framework first upstanding member and the first framework lateral member, a first framework pivot connector joining the first framework second upstanding member and the first framework lateral member, and a first framework swing, arm pivotably extending from the first framework connector;

a second framework opposite the first framework comprising a second framework first upstanding member, a second framework second upstanding member, and a second framework lateral member extending between the second framework first and second upstanding members, a second pair of second framework in-line hinge members pivotably connecting each of the second framework first upstanding member and the second framework second upstanding member to one of the static three-way corner pieces of the base framework through a nipple, a second framework clip connector joining the second framework first upstanding member and the second framework lateral member, a second framework pivot connector joining the second framework second upstanding member and the second framework lateral member, and a second framework swing arm pivotably extending from the second framework pivot connector, the first framework clip connector comprises a connector port with a biasable opening configured to removably receive the second framework swing arm;

the second framework clip connector comprises a connector port with a biasable opening configure to removably receive the second framework swing arm;

a covering extending substantially across the base framework, the first framework, the second framework, and between the first and second frameworks defining a plurality of surface members;

whereby the covering is removably attachable to the first an second swing arms;

whereby the collapsible pet kennel is in a first collapsed position with the first swing arm positioned against the first framework lateral member, the second swing arm positioned against the second framework lateral member, and the first framework and the second framework positioned across the base framework, rotating the first and second frameworks away from the base framework about the respective first and second pair of in-line hinge connectors;

rotating the first framework swing arm away from the first framework lateral member about the first framework pivot connector;

receiving the first framework swing arm within the biasable opening of the connector port of the second framework clip connector;

attaching the covering to the first framework swing arm;

rotating the second framework swing arm away from the second framework lateral member about the second framework pivot connector;

receiving the second framework swing arm within the biasable opening of the connector port of the first framework clip connector; and attaching the covering to the second framework swing arm.

10. The method of claim 9, wherein the first and second framework arms are attached to the covering with a plurality of interfacing hook and loop fasteners.

11. The method of claim 9, wherein the coveting comprises a plurality of channels located at the intersections of the surface m embers extending across or from the base framework through which the base members are placed.

12. The method of claim 9, wherein the covering comprises a plurality of channels located at the intersections of the surface members extending across or from the first and second frameworks through which the first framework members and the second framework members are placed.

* * * * *